United States Patent [19]
Bahl et al.

[11] Patent Number: 5,787,394
[45] Date of Patent: Jul. 28, 1998

[54] STATE-DEPENDENT SPEAKER CLUSTERING FOR SPEAKER ADAPTATION

[75] Inventors: Lalit Rai Bahl, Amawalk; Ponani Gopalakrishnan, Yorktown Heights; David Nahamoo, White Plains; Mukund Padmanabhan, Ossining, all of N.Y.

[73] Assignee: International Business Machines Corporation, Armonk, N.Y.

[21] Appl. No.: 572,223

[22] Filed: Dec. 13, 1995

[51] Int. Cl.$^6$ ............................................. G10L 5/06
[52] U.S. Cl. .................. 704/238; 704/231; 704/236; 704/239; 704/245
[58] Field of Search ................ 395/2.45, 2.52, 395/2.54, 2.62, 2.63; 704/236, 238, 243, 245, 253, 254

[56] References Cited

U.S. PATENT DOCUMENTS

| | | | |
|---|---|---|---|
| 4,817,156 | 3/1989 | Bahl et al. | 704/256 |
| 4,852,173 | 7/1989 | Bahl et al. | 704/240 |
| 4,922,539 | 5/1990 | Rajasekaran et al. | 704/219 |
| 5,033,087 | 7/1991 | Bahl et al. | 704/256 |
| 5,241,619 | 8/1993 | Schwartz et al. | 704/200 |
| 5,276,766 | 1/1994 | Bahl et al. | 704/256 |
| 5,293,584 | 3/1994 | Brown et al. | 704/277 |
| 5,488,652 | 1/1996 | Bielby et al. | 379/88 |
| 5,497,447 | 3/1996 | Bahl et al. | 704/245 |

OTHER PUBLICATIONS

"A tree Based Statistical Language Model for Natural Language Speech Recognition", Bahl et al, Jul. '89, IEEE Transactions on Acoustics, Speech, and Signal Processing.

*Primary Examiner*—David R. Hudspeth
*Assistant Examiner*—Michael N. Opsasnick

[57] ABSTRACT

A system and method for adaptation of a speaker independent speech recognition system for use by a particular user. The system and method gather acoustic characterization data from a test speaker and compare the data with acoustic characterization data generated for a plurality of training speakers. A match score is computed between the test speaker's acoustic characterization for a particular acoustic subspace and each training speaker's acoustic characterization for the same acoustic subspace. The training speakers are ranked for the subspace according to their scores and a new acoustic model is generated for the test speaker based upon the test speaker's acoustic characterization data and the acoustic characterization data of the closest matching training speakers. The process is repeated for each acoustic subspace.

23 Claims, 5 Drawing Sheets

STATE-DEPENDENT SPEAKER CLUSTERING FOR SPEAKER ADAPTATION

FIELD OF THE INVENTION

The invention relates to speaker adaptation in speech recognition systems.

BACKGROUND OF THE INVENTION

Speech recognition systems are based on using the correlation between a spoken word and the characterization of that word in the acoustic space. These characterizations are typically obtained from training data. The training data could be derived from a number of speakers, which would result in a speaker independent system, or it could be derived from a single speaker, the same speaker who would be using the system. In the latter case, the system is said to be speaker-dependent. Typically, speaker-independent recognition systems recognize speech less accurately than speaker-dependent systems (by about 35% for continuous speech). This is because speaker-independent systems try to capture the average statistics across several speakers, and may not characterize any single speaker particularly well. However, speaker-dependent systems have the disadvantage that they require the test speaker to provide a significant amount of training data.

It is possible to improve upon speaker-independent performance to some extent, without requiring the test speaker to train-up a speaker-dependent system. As the speaker-independent system is trained on a number of speakers, the statistics reflect the variations among all these speakers. To some extent, the statistics can be made more specific by making a gender-dependent system, which corresponds to dividing the space of test speakers into two sets, and training the system to model the characteristics of each set separately. This idea could also be extended further by making up several speaker clusters, rather than just two. However, as the number of speakers in the training data is limited, improvement using such means is usually marginal.

An alternative to these methods for the purpose of sharpening the characteristics of the system to better match a test speaker, is speaker adaptation. With speaker adaptation, a few sentences from the test speaker are used to tailor the system to the speaker. So far, speaker adaptation techniques have taken on two forms: in a first scheme, the test speaker's data is transformed to better match the model statistics (see, e.g., J. R. Bellegarda, P. V. de Souza, A. Nadas, D. Nahamoo, M. A. Picheny and L. R. Bahl, "The Metamorphic Algorithm: A Speaker Mapping Approach to Data Augmentation", IEEE Transactions on Speech and Audio Processing, vol. 2, no. 3, pp 413–420, July 1994 ("Bellegarda")); in the second scheme, the model is tailored to better fit the test speaker's characteristics (see e.g., C. J. Legetter and P. C. Woodland, "Speaker Adaptation of Continuous density HMM's using Multivariate Linear Regression", ICSLP 194, vol. 2, pp 451–454 ("Legetter"); George Zavaliagkos, "Bayesian Adaptation Techniques for Speaker Adaptation", Ph.D thesis, Northeastern University, 1995 ("Zavaliagkos"); V. Digalakis and L. Neumeyer, "Speaker Adaptation using Combined Transformation and Bayesian techniques", Proceedings of the Intl. Conf. Acoustics, Speech and Signal Processing, May, 1995).

There are several techniques that have evolved within the framework of the second scheme. For instance, in Legetter and Digilakis the new model parameters are assumed to be related to the speaker-independent parameters via a linear transformation, and the transform is computed to maximize the likelihood of the test speaker's adaptation data. Alternatively, it is possible to accumulate statistics from the test speaker's adaptation data and re-estimate the system parameters by smoothing these statistics back to the speaker-independent parameters, which is equivalent to computing a maximum-a-posteriori estimate of the system parameters (see Zavaliagkos and J. L. Gauvain and C. H. Lee, "Maximum-a-posteriori Estimation for Multivariate Gaussian Observations of Markov Chains", IEEE Transactions on Speech and Audio Processing, vol. 2, no. 2, pp 291–298, April 1994 (here, the inter-speaker variability in the training data is characterized by a prior distribution on the parameters of the system, and this prior distribution is used in conjunction with the collected statistics to re-estimate the parameters)).

SUMMARY OF THE INVENTION

In this invention, we present an adaptation technique based on speaker clustering. Typically, the drawback of speaker clustering is that one needs a very large number of training speakers in order to ensure that at least one cluster of training speakers matches the test speaker, i.e., the training speakers in this cluster are acoustically very similar to the test speaker. This drawback makes the straightforward technique of speaker clustering impractical. However, this invention presents a clustering technique that can be used with relatively very few training speakers.

This invention is prompted by the observation that a particular training speaker may be close to the test speaker in a certain region of the acoustic space, but far away in other regions, i.e., two speakers may pronounce the phone AA in the same way, but the phone R in an entirely different way. In such situations, it is obviously incorrect to conclude that the two speakers are close together in general. In order to solve this problem, this invention proposes the idea that the set of training speakers deemed to be close to a test speaker should be determined independently for different sounds. Hence, we would have independent sets of training speakers that characterize different sounds of the test speaker, and the acoustic prototype characterizing the sounds of the test speaker would be made from data obtained from these independent training speaker sets. This invention also proposes the extension of this idea to model other aspects of the system statistics, for instance the modelling of the duration of certain sounds.

An objective of the invention is to take a few sentences of the test speaker's data and use this data to obtain a subset of training speakers who are "close" to the test speaker, with the list of speakers being possibly different for different regions of the acoustic space. The models corresponding to a region of the acoustic space are then remade (i.e., means and variances of the Gaussians are re-estimated) based only on data from the subset of training speakers for that acoustic subspace, in order to produce a model that is a sharper fit to the test speaker. Further, the data from each training speaker can be transformed (using linear (see Legetter) or non-linear (see Bellagarda) technique to bring it even closer to the test speaker, for the particular sound. The invention first calculates the acoustic characterization of the training speakers for all regions of the acoustic space (possibly corresponding to phone classes) from the training speakers' data. Subsequently, a few sentences of the test speaker are used to acoustically characterize the same regions of the acoustic space. A distance score is now computed between the test speaker's models for an acoustic subspace, and the training speakers' model for the same acoustic subspace, for all training speakers. The training speakers are now ranked on the basis of this score. Note that the ranking could be different for different phone classes. Subsequently, the acoustic models for a particular phone class are remade using only data from those training speakers who are the closest to the test speaker for that phone class.

The invention also extends this idea to apply to other aspects of the system models. For instance, because many speakers vary in the length of time over which they pronounce a sound, the speakers could also be characterized by the duration of the phone classes, and the similarity between a test speaker and a training speaker could be determined on the basis of the similarity in the length distribution for the phone class. Hence, the duration model for a particular phone class is remade based on the duration models of only those training speakers who have been selected as being "close" to the test speaker for that phone class.

One embodiment of the invention in the above form will iterate twice in using the training speakers' data; in the first step, the shortlist of training speakers who are deemed to be close to the test speaker is generated, and in the second step, the training data is re-used from the speakers in the shortlist, in order to remake various aspects of the model to better fit the test speaker.

For the case where the acoustic space is modeled as a mixture of Gaussians, the means and variances of the Gaussians are re-estimated using the data from the short list of training speakers. Note that if training speaker 1 has been selected as being close to the test speaker in the acoustic space of phone AA, then only the subset of the training speaker's data that is aligned to the phone AA will be used in the re-estimation process. Further, as mentioned earlier, it is possible to compute a linear (Legetter) or non-linear (Jerome) transform that maps to the training speaker's data in the selected acoustic base to be even closer to the test speaker space.

As far as other model aspects are concerned, as for example the duration of phone classes, the same process as above is followed to select the subset of the training data that is used to re-estimate the model parameters.

It is also possible to avoid having to reuse the training data by storing the models of the training speakers for various phone classes, and simply assembling these training speaker models to make up the new model for the test speaker.

DESCRIPTION OF THE PREFERRED EMBODIMENTS

In accordance with the invention, the acoustic space is divided into several regions, and the characteristics of each training speaker are modelled for each region. In order to be able to find the distance between the test speaker and each training speaker, models are generated for the test speaker for the same regions. As far as the training speakers are concerned, it is preferable that there be enough data to generate separate models for several small regions of the acoustic space, such as a phone in a particular context (henceforth, these regions will be referred to as leaves). Note that these training speaker models differ from the speaker-independent models that are finally used in the decoder, which typically model the leaves by much more detailed models. Because only a few sentences of test speaker data have been obtained, it may not be possible to generate test speaker models for all leaves; for instance, it may be possible to characterize the test speaker only at the level of phones (regardless of context), or groups of phones. Consequently, it is useful to have a hierarchical scheme for constructing the training speaker models, depending on how the test speaker data can be characterized.

Figure 1:
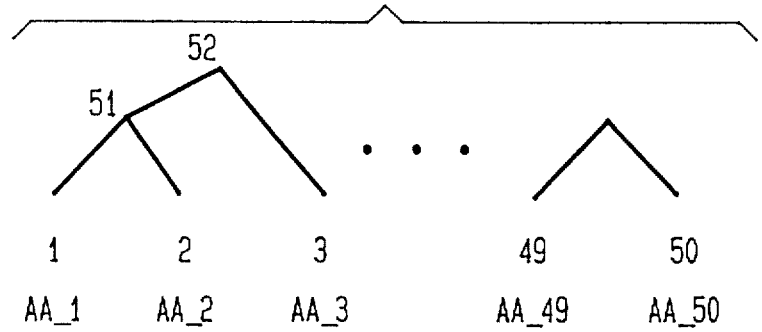
FIG. 1 shows tree diagrams corresponding to a plurality of different contexts of the phone AA.

An example that demonstrates this hierarchical scheme is depicted in FIG. 1. The phone AA could be characterized, for instance, by 50 different contexts (AA__1 through AA__50), and a model could therefore be made for each training speaker for each of these contexts. These contexts correspond to the terminal leaves of the tree in FIG. 1. These models can also be merged to form models for groups of phones-in-context, as shown in FIG. 1. The rules governing the merging of these models can be derived by a bottom-up clustering procedure, as in FIG. 1, or by alternative means. Hence, in FIG. 1, node 51 represents a region of the acoustic space that contains instances of the phone AA in two different contexts, AA__1 and AA__2, and a model could be constructed to represent node 51 by combining the models for nodes 1 and 2. Similarly, the acoustic space representing nodes 51 and 3 can be combined to form node 52.

Figure 2:
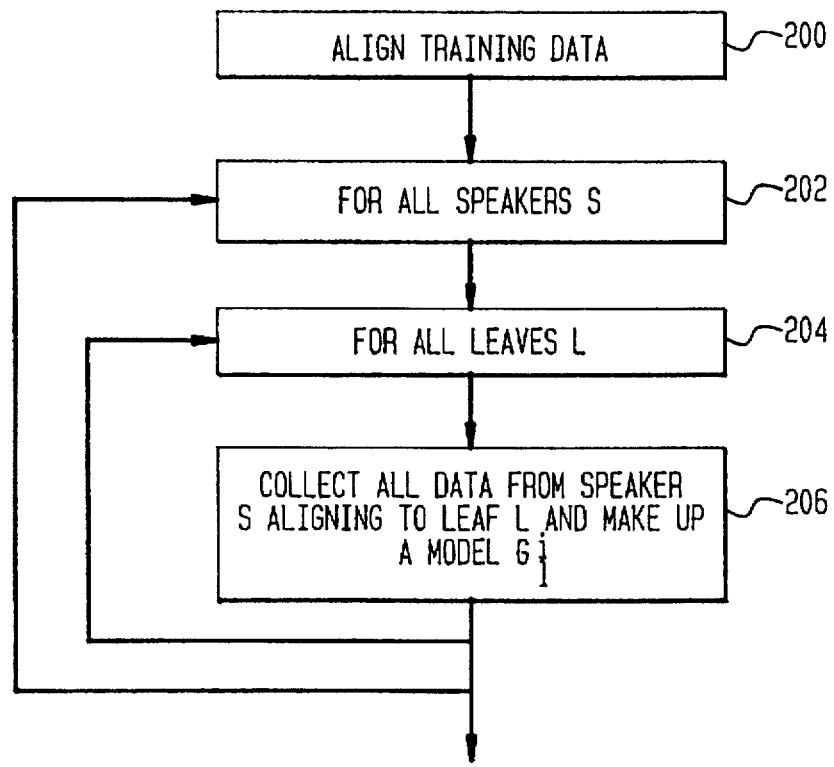
FIG. 2 is a flow diagram of a method for generating training speaker models.

A method for constructing the training speakers' models is depicted in FIG. 2. For each speaker (step 202), the data aligning to each leaf l (step 204) is collected, and a model is constructed for the leaf (step 206). One possible way to model the acoustic feature vectors is to use a mixture of Gaussians. If length distributions are used, one possible modeling technique is by approximating the length distribution by a poisson distribution.

Let $S=[s_1,\ldots,s_S]$ represent the set of all training speakers in the training data. Further, let $G_l^i$ represent the model for leaf l of training speaker i (one possible model is a single Gaussian).

Figure 3:
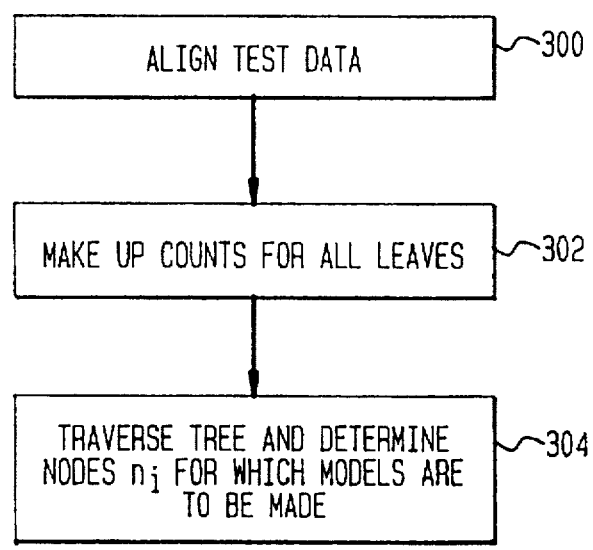
FIG. 3 is a flow diagram of a method for generating test speaker models.

The manner in which the test speaker's models are constructed is depicted in FIG. 3. The test speakers adaptation data, which consists of acoustic feature vectors for the test speaker, is first aligned at step 300 using the viterbi alignment algorithm, which enables every vector to be tagged by a leaf, and the alignments are stored.

The counts of the number of feature vectors corresponding to the different leaves of a tree such as the one in FIG. 1 is obtained (step 302). If the count at any leaf is insufficient to allow reliable construction of a model for that leaf, where reliability can be based, for instance, on a threshold count, then the hierarchy shown in FIG. 1 is used to determine the node upstream from the inadequate leaf at which there is sufficient test speaker data to reliably estimate a model (step 304). Hence, for inadequate leaves the test speaker is characterized by a model comprising these reliable nodes, rather than the leaves. The reliable nodes could represent phones, or groups of phones. Next, the training speaker models must also be constructed for these same (reliable)

nodes, and this is done by assembling the models for all the leaves which form the node, according to the hierarchy of FIG. 1.

Let $[n_1, \ldots, n_N]$ represent the nodes of the tree for which test speaker models are made, and let $L_i=[1_1^i, \ldots, 1_{ki}^i]$ represent the leaves that are shared to form node $n_i$, according to the hierarchy of FIG. 1.

It now remains to compute the distance between the models of the test speaker and each training speaker, for the corresponding nodes. This can be done in one of several ways. For example, the test speaker model for a node could simply be taken to be all the feature vectors that align to the node, and each training speaker's model for the node could be made up as a mixture of Gaussians corresponding to all the leaves that are shared at that node. Hence, a measure of the closeness between the test speaker and a training speaker could be simply the likelihood of the test speaker's data at that node, computed using the training speaker's mixture of Gaussians for that node. Each training speaker is then ranked according to this distance, and a shortlist of training speakers is produced representing the training speakers, that are closest to the test speaker for that node. Let $S_i$ denote the shortlist of speakers corresponding to node $n_i$.

Figure 4:
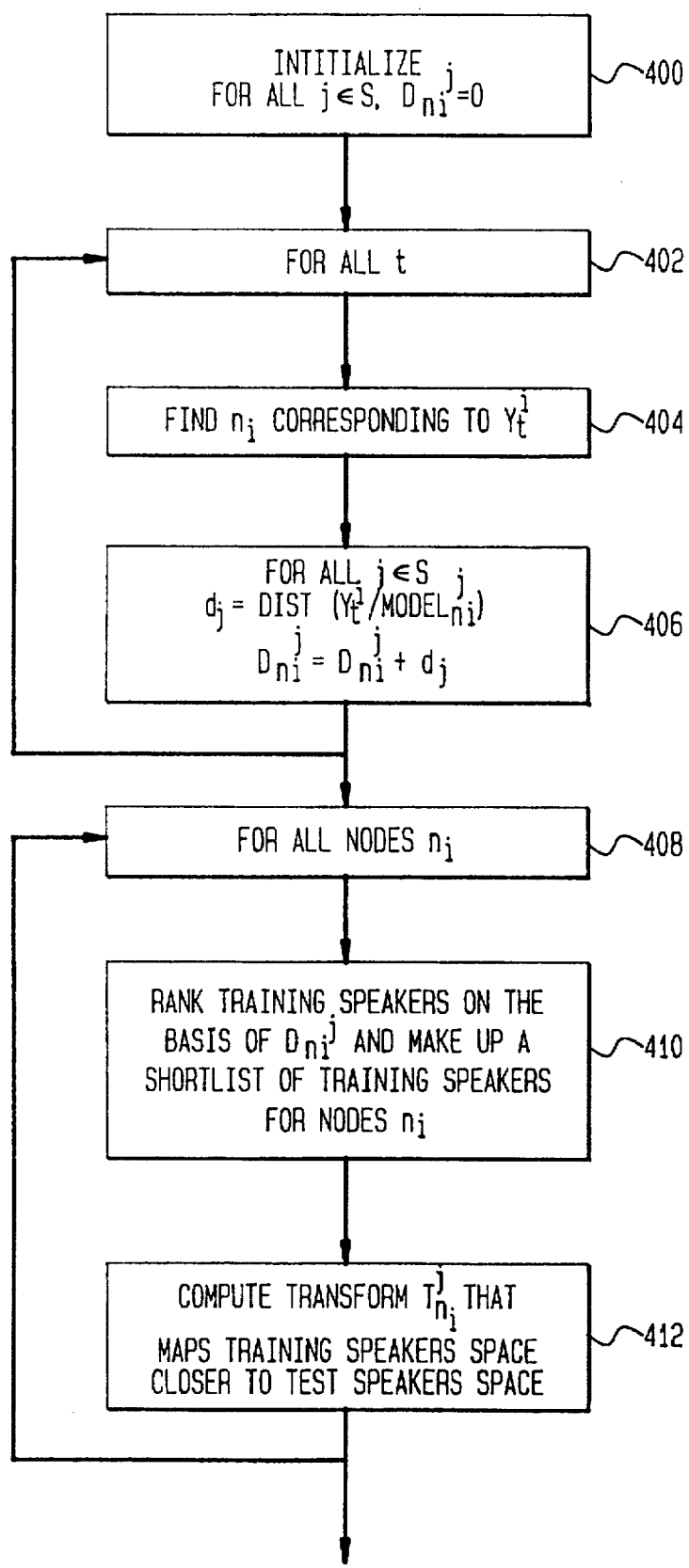
FIG. 4 is a flow diagram of a method for computing the distance between the training speaker and test speaker models.

This shortlist generation process is depicted in FIG. 4. Here, $Y_t^i$ represents the acoustic feature vector of the $t^{th}$ frame of test speaker data (for notational convenience, all sentences of the test speaker are assumed to have been concatenated into one sentence), and the superscript i indicates that this frame has been aligned to leaf i. The test speaker data is viterbi aligned against the script (this could be the correct script corresponding to supervised adaption, or the script obtained by a first pass decoding, corresponding to unsupervised adaptation.) and each acoustic feature vector is assigned a tag that is a leaf id.

Now, as mentioned earlier, there is insufficient test speaker data to enable a modeling of each leaf, hence, groups of leaves are combined in accordance with FIG. 1 to form a model at a node that includes these groups of leaves, which correspond to nodes $n_i$ in the tree of FIG. 1. Hence, each leaf id i in the test speakers alignment can be replaced by the node $n_i$ which represents the node in the tree of FIG. 1 that includes leaf i, and for which there is sufficient data to make up a model for the test speaker. This is done in block 404.

Hence, let $y_t^{ni}$ represent the vector at time t, that has been tagged with node $n_i$ (which refers to a node in the tree of FIG. 1). The term $Dist(Y_t^{ni}/Model_{ni}^j)$ represents the distance between the acoustic feature vector $Y_t^{ni}$ and the model of training speaker j for node $n_i$. One possibility is to make $Model_{ni}^j=G_{ni}^j$, i.e., use a single Gaussian. In this case, the distance may be computed simply as the likelihood, or as the euclidean distance between the feature vector $Y_t^{ni}$ and the mean of the Gaussian.

Thus, referring to FIG. 4, the process is as follows. At step 400, $D_{ni}^j$ is initialized to 0 for each j∈S. Next, for all t, and for a speaker j, compute: a) the distance $d_j$ between acoustic vector $Y_t^{ni}$, and the model ($Model_{ni}^j$) of training speaker j for node $n_i$; and b) add these dj together to form the distance $D_{ni}^j$ between the test speaker and training speaker j for node $n_i$ (steps 402, 404 and 406). Repeat this for all training speakers j∈S. Next, for all nodes $n_i$, the training speakers are ranked on the basis of the values of $D_{ni}^j$, and a shortlist of training speakers for node $n_i$ is compiled, comprising the training speakers with the lowest values of $D_{ni}^j$ (steps 408 and 410).

Once a shortlist of speakers has been selected for each $n_i$, the data from this shortlist of speakers can be directly used to re-estimate the parameters of the Gaussians that characterize the acoustic region corresponding to node ni. Further, instead of using the training speakers data directly, it is also possible to compute a transformation for every training speaker in the shortlist that when applied to the training speakers data, will bring the training speakers data (in the acoustic subspace corresponding to node $n_i$) even closer to the test speakers space.

Either a linear or non-linear transformation can be used for this purpose, as in Legetter or Bellagarda. For example, a linear transformation can be computed to maximize the likelihood of the test speaker data that has aligned to node ni given the $j^{th}$ training speakers model for node ni. The transformation that maps the acoustic subspace corresponding to node ni for the $j^{th}$ training speaker closer to the subspace corresponding to node $n^i$ of the test speaker is denoted $T_{ni}^j$ and computed in block 412.

Figure 5:
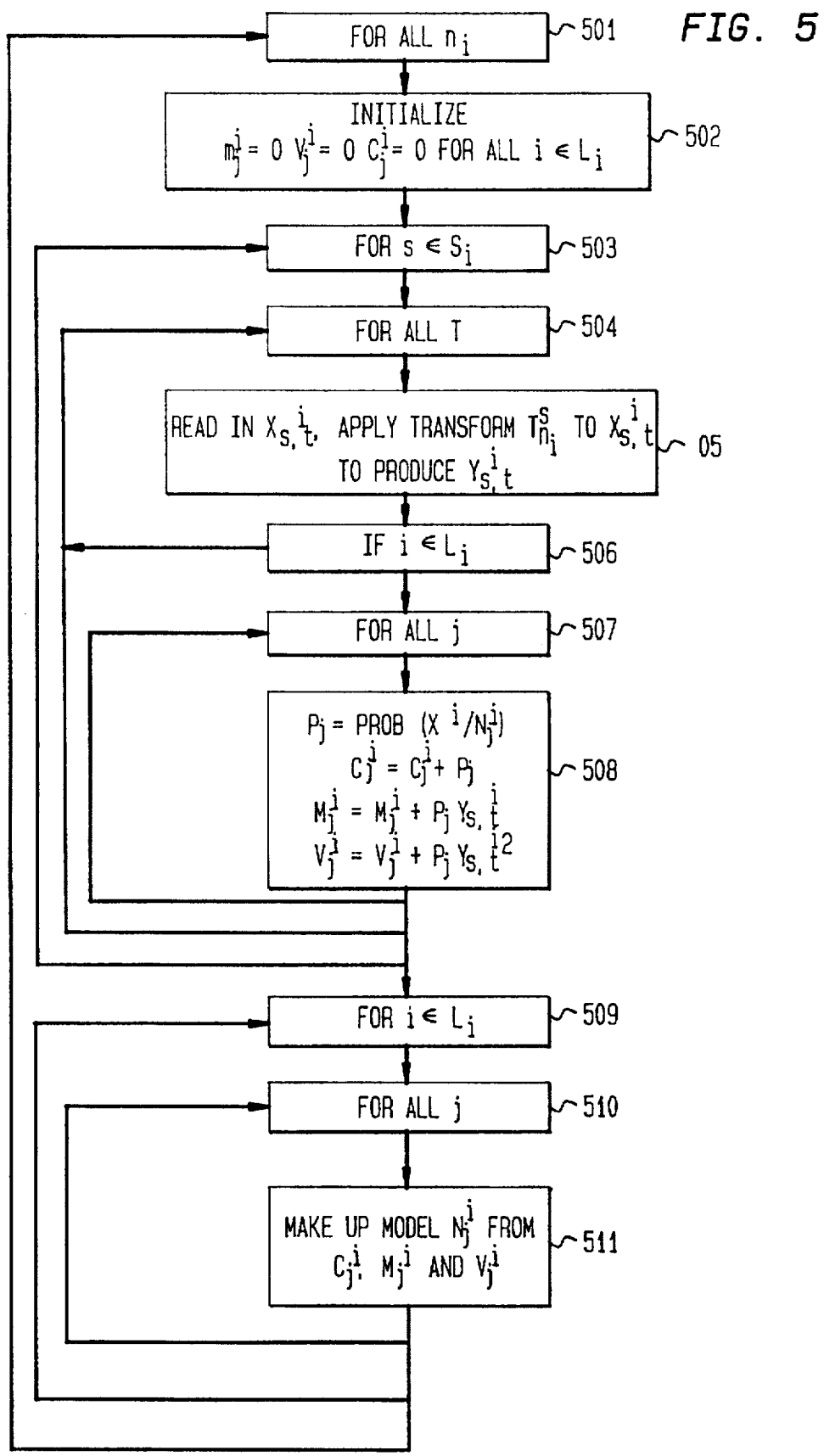
FIG. 5 is a flow diagram depicting a method for modifying the prototypes of a speaker independent system using speaker shortlists available for selected nodes.

The only remaining issue is how to modify the prototypes of the speaker-independent system using the speaker shortlists that are available for selected nodes in the hierarchy of FIG. 1. This process is shown in FIG. 5. As mentioned earlier, the test speaker is characterized by a model at several nodes, and each of these nodes corresponds to grouping together a number of leaves and/or nodes. The speaker-independent system typically models the acoustics at each leaf by a mixture of Gaussians (the length distribution can be modelled by imposing a topology on the hidden Markov model for the leaf, e.g., the model for a leaf should be at least seven feature vectors long). Let $N_i=[N_1^i, \ldots, N_{ni}^i]$ represent the Gaussians of the training speakers that correspond to leaf i.

In FIG. 4, it was shown how to obtain a shortlist of training speakers who are close to the test speaker in the acoustic space corresponding to a particular node. This shortlist of speakers is used to modify the prototypes of the speaker-independent system corresponding to that node, as shown in FIG. 5. In this figure, $M_j^i$ represents a vector $V_j^i$ represents a matrix, and $C_j^i$ represents a scalar, $X_{s,t}^i$ represents the $t^{th}$ frame of training speaker s, aligned to leaf i. $Prob(X_{s,t}^i/N_j^i)$ indicates the likelihood of the feature vector, given the Gaussian $N_j^i$. $Y_{s,t}^i$ represents the feature vector obtained after applying the transformation $T_{ni}^s$ to $X_{s,t}$ and $Y_{s,t}^{i2}$ meant to indicate that each element of the vector $Y_{s,t}^i$ has been squared. Note that it is possible not to use the transformation, in which case $Y_{s,t}^i=X_{s,t}^i$. Once the prototypes have been remade, the remainder of the test speakers data are decoded with the updated prototypes.

FIG. 5 will now be described in detail. In order to estimate the means and co-variances of the Gaussians, it is first necessary to compute the moments of the data. By moments, we mean the following: $p_j^i$, the posterior probability of a feature vector being generated by the $j^{th}$ Gaussian modeling leaf i. (Note that $$\sum_j p_j^i = 1).$$

The first moment given by equation $$\sum_t p_j^i Y_{s,t}$$

where $Y_{s,t}$ is the transformed feature vector at time t for the $s^{th}$ training speaker, and the second moment $$V_j^i = \sum_t p_j^i Y_{s,t} Y_{s,t}^T.$$

For the case where the co-variance matrix is assumed to be diagonal, $V_j^i$ can be replaced by $$V_j^i = \sum_t p_j^i Y_{s,t}^2$$

where $Y_{s,t}^2$ denotes a vector made up by squaring every element in the vector $Y_{s,t}$. For each node $n_i$, the process uses the data from the shortlist of training speakers made up for node $n_i$ to re-estimate the Gaussian parameters of the speaker-independent model corresponding to node $n_i$. (Blocks 501–504). For our case, as we already have the leaf-level alignments of the training data, the $(p_j^i)$ can be computed as $$\frac{(p_j^i)'}{\sum_j (p_j^i)'},$$

where i is the leaf to which the current feature vector has been aligned, and the index j denotes the $j^{th}$ prototype used to model the data at that leaf. In order to re-estimate the Gaussian parameters, it is necessary to compute the moments of the data. The training speakers data can be directly used for this purpose, or the transformed training speakers data can be used for this purpose. As shown in FIG. 4, it is possible to compute a transformation (linear or non-linear) that maps the training speakers space closer to the test speaker in the acoustic subspace corresponding to node $n_i$. Let us denote the feature vector after applying the transformation as $y_{s,t}^i$ (s denotes the $s^{th}$ training speaker, t denotes the $t^{th}$ feature vector, i denotes the leaf to which the feature vector was aligned and the transform $T_{n_i}^s$ was applied to $x_{s,t}^i$ to transform it to $y_{s,t}^i$ (Block 505).

The moments of the data are computed using the transformed feature vector $Y_{s,t}^i$ (Block 508) and the Gaussian parameters re-estimated from the moments (Block 511).

Figure 6:
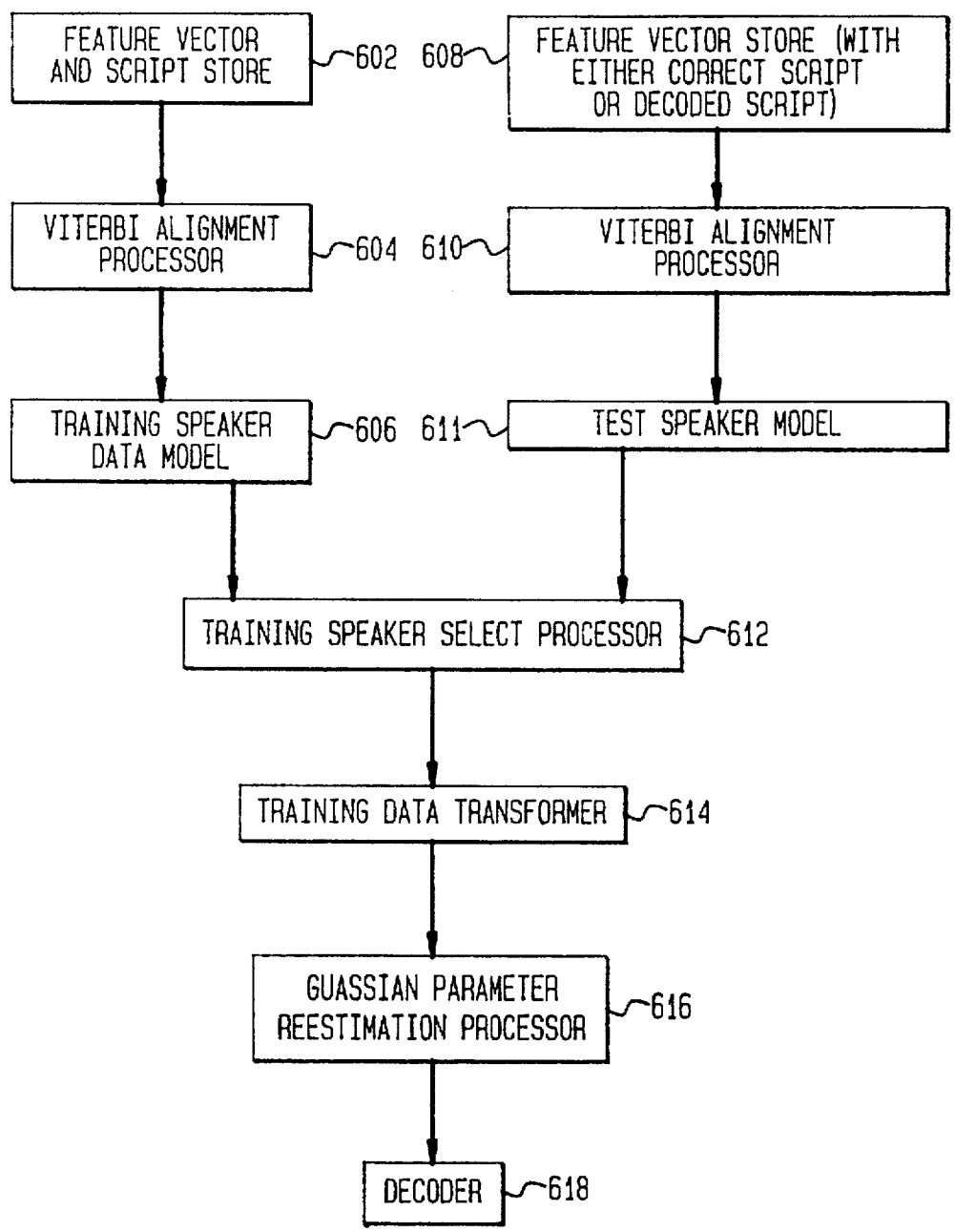
FIG. 6 is a block diagram of a system in accordance with the invention.

FIG. 6 is a system diagram of system implementing the method of the invention. A system in accordance with the invention includes a feature store 602, viterbi alignment processor 604, speaker training data model 606, feature vector store 608, viterbi alignment processor 610, best speaker model 611, training speaker select processor 612, training data transformer 614, Gaussian parameter re-estimation processor 616 and decoder 618. The feature vector and script store 602 stores feature vectors of training speakers along with the accompanying script used to produce those feature vectors. The viterbi alignment processor 604 uses the script and corresponding feature vectors to assign classes to each feature vector using hidden Markov models. The training speaker data model collects feature vectors that belong to particular leaves for a particular training speaker and computes a model, (e.g., a Gaussian) based on the data at each leaf. The feature vector store 608 collects and stores feature vectors and the script of the test speaker. The script can be the correct script, or a script produced by prior decoding. The viterbi alignment processor 610 computes the viterbi alignment and 611 the test speaker model (i.e., nodes for which the test model can be made based only on the test data available). Training speaker select processor 612 is used to select training speakers that are closest to the test speaker for a selected node in the tree. Training data transformer 614 applies a transform on the selected training speakers to better map the training data to the test speaker's acoustic space. Gaussian parameter re-estimation processor 616 estimates the first and second moment and posterior probability of a transformed feature vector belonging to a Gaussian. From these, it is possible to compute means and variances. Decoder 618 decodes the test speakers data using the new Gaussians estimated in block 616.

The features of FIG. 16 can be implemented in a general purpose computer.

We claim:

1. A method for adapting the parameters of a speech recognition system during a training process, to better recognize speech of a particular test speaker comprising the steps of:

calculating the acoustic characterization of a plurality of training speakers for all acoustic subspaces of an acoustic space, the acoustic characterizations being individually identifiable for each training speaker for each acoustic subspace;

calculating the acoustic characterization of a test speaker from adaptation data provided by said test speaker for acoustic subspaces of the acoustic space;

computing a match score between the test speaker's characterization for each acoustic subspace, and each training speaker's characterization for the same acoustic subspace;

ranking each of the training speakers in the acoustic subspace based upon the score; and for each acoustic space, generating a re-estimated acoustic model for the particular acoustic subspace using individually identifiable data respectively derived from the one or more training speakers closest to the test speaker for that acoustic subspace, the re-estimated acoustic model for each acoustic subspace being used during a decoding process.

2. The method of claim 1, wherein the speakers are characterized by the duration of a phone class, and wherein the training speakers closest to the test speaker are determined to be those with the closest duration distribution.

3. The method of claim 1, wherein the step of generating an acoustic model comprises:

generating a shortlist of training speakers who are deemed to be close to the test speaker in that acoustic subspace; and using the training data of the shortlisted speakers to construct a model for the test speaker in that acoustic subspace.

4. The method of claim 1, wherein the step of calculating the acoustic characterization of a plurality of training speakers comprises:

generating a hierarchical tree representing the contextual characterization of each phone for each training speaker, the tree terminating in a plurality of leaves, each leaf representing a phone in a given context, the tree further including one or more nodes each representing similar ones of the leaves, or of similar ones of the leaves and other nodes.

5. The method of claim 4, wherein each leaf represents a region in the acoustic subspace.

6. The method of claim 5, wherein the step of calculating the acoustic characterization of the test speaker comprises:

producing an alignment of the test speaker's data and tagging each feature vector with a leaf; and wherein when insufficient data exists for the construction of a model at a leaf, constructing a model at a node of the tree that includes that leaf.

7. The method of claim 6, wherein the step of computing a match comprises:

measuring the distance, in acoustic space, between corresponding nodes of the test speaker's model and each training speaker's model.

8. The method of claim 7, wherein the step of measuring the distance comprises:

determining the likelihood of the test speaker's data at a particular node of the test speaker's tree given the training speaker's model at the corresponding node, made up by using the training speaker data at all leaves comprising that node.

9. The method of claim 8, wherein the likelihood is computed using the training speaker's mixture of Gaussians for that node.

10. The method of claim 1, further comprising:

computing a transformation to map the acoustic subspace of the selected training speaker closer to the corresponding subspace of the test speaker.

11. The method of claim 1, further comprising:

computing a transformation to map the acoustic subspace of the selected training speaker closer to the corresponding subspace of the test speaker; and using the transformed training data of the shortlisted speakers to construct a model for the test speaker in that acoustic subspace.

12. A system comprising:

means for adapting the parameters of a speech recognition system during a training process to better recognize speech of a particular test speaker:

means for calculating the acoustic characterization of a plurality of training speakers for all acoustic subspaces of an acoustic space, the acoustic characterizations being individually identifiable for each training speaker for each acoustic subspace;

means for calculating the acoustic characterization of a test speaker from adaptation data provided by said test speaker for acoustic subspaces of the acoustic space;

means for computing a match score between the test speaker's characterization for each acoustic subspace, and each training speaker's characterization for the same acoustic subspace;

means for ranking each of the training speakers in the acoustic subspace based upon the score; and means for each acoustic space, for generating a re-estimated acoustic model for the particular acoustic subspace using individually identifiable data respectively derived from the one or more training speakers closest to the test speaker for that acoustic subspace, the re-estimated acoustic model for each acoustic subspace being used during a decoding process.

13. The system of claim 12, further comprising:

means for speaker characterization by the duration of a phone class, and wherein the training speakers closest to the test speaker are determined to be those with the closest duration distribution.

14. The system of claim 12, wherein the means for generating an acoustic model comprises:

means for generating a shortlist of training speakers who are deemed to be close to the test speaker in that acoustic subspace; and means for using the training data of the shortlisted speakers to construct a model for the test speaker in that acoustic subspace.

15. The system of claim 12, wherein the means for calculating the acoustic characterization of a plurality of training speakers comprises:

means for generating a hierarchical tree representing the contextual characterization of each phone for each training speaker, the tree terminating in a plurality of leaves, each leaf representing a phone in a given context, the tree further including one or more nodes each representing similar ones of the leaves, or of similar ones of the leaves and other nodes.

16. The system of claim 15, wherein each leaf represents a region in the acoustic subspace.

17. The system of claim 16, wherein the means for calculating the acoustic characterization of the test speaker comprises:

means for producing an alignment of the test speaker's data and tagging each featured vector with a leaf; and where insufficient data exists for the construction of a model at a leaf, means for constructing a model at a node of the tree that includes the leaf.

18. The system of claim 17, wherein the means for computing a match comprises:

means for measuring the distance, in acoustic space, between corresponding nodes of the test speaker's model and each training speaker's model.

19. The system of claim 18, wherein the means for measuring the distance comprises:

means for determining the likelihood of the test speaker's data at a particular node of the test speaker's tree given the training speaker's model at the corresponding node, made up by using the training speaker data at all leaves comprising that node.

20. The system of claim 19, wherein the likelihood is computed using the training speaker's mixture of Gaussians for that node.

21. The system of claim 12, further comprising:

means for computing a transformation that maps the training speaker data in the acoustic subspace to bring the training speaker data closer with respect to a calculated distance to the test speakers subspace, the transformation mapping reducing the calculated distance to achieve acoustic similarity between the transformed data of the training speaker and the data of the test speaker.

22. The system of claim 12, further comprising:

means for computing a transformation to map the acoustic subspace of the selected training speaker closer to the corresponding subspace of the test speaker.

23. A training system, comprising:

a training speaker feature vector and training script store for storing a script and a plurality of test speakers utterances of the training script;

a viterbi alignment processor for aligning each of the plurality of training speakers' feature vectors with the training script;

a training speaker data model for modeling each of the training speakers' feature vectors in acoustic space, given the alignment with the training script;

a test speaker feature vector and test script store for storing feature vectors representing a test speaker's utterances of the test script;

a test speaker viterbi alignment processor for aligning the test speaker's feature vectors with the test script;

a training speaker select processor for selecting for each of a plurality of acoustic subspaces in the acoustic space, one or more individually identifiable training speakers whose feature vectors most closely match the test speaker's feature vectors in that acoustic subspace;

a training data transformer for mapping the selected training speaker's feature vectors to the test speakers' feature vectors;

a Gaussian parameter re-estimation processor for estimating the first and second moment and posterior probability of the mapped feature vectors; and a decoder for decoding the estimated moments and probability.

* * * * *